US010940601B2

(12) United States Patent
Adair et al.

(10) Patent No.: US 10,940,601 B2
(45) Date of Patent: Mar. 9, 2021

(54) SAMPLE PREPARATION SAW

(71) Applicant: Illinois Tool Works Inc., Glenview, IL (US)

(72) Inventors: Kurt G. Adair, Highland Park, IL (US); Douglas A. Ceckowski, Gurnee, IL (US); Michael F. Hart, Mundelein, IL (US)

(73) Assignee: Illinois Tool Works Inc., Glenview, IL (US)

( * ) Notice: Subject to any disclaimer, the term of this patent is extended or adjusted under 35 U.S.C. 154(b) by 285 days.

(21) Appl. No.: 16/105,621

(22) Filed: Aug. 20, 2018

(65) Prior Publication Data
US 2019/0001518 A1 Jan. 3, 2019

Related U.S. Application Data

(63) Continuation of application No. 14/420,669, filed as application No. PCT/US2013/055011 on Aug. 24, 2013, now Pat. No. 10,081,116.
(Continued)

(51) Int. Cl.
*B26D 7/26* (2006.01)
*B23D 47/12* (2006.01)
(Continued)

(52) U.S. Cl.
CPC ............. *B26D 7/26* (2013.01); *B23D 47/12* (2013.01); *B23D 59/001* (2013.01); *B26D 1/12* (2013.01);
(Continued)

(58) Field of Classification Search
CPC . B26D 7/26; B26D 1/12; B23D 47/12; B23D 59/001; Y10T 83/866; Y10T 83/04; Y10T 83/141
See application file for complete search history.

(56) References Cited

U.S. PATENT DOCUMENTS 3,715,946 A 2/1973 Kaltenback
4,357,848 A * 11/1982 Sakurai ................. B23D 55/06
83/360
(Continued)

FOREIGN PATENT DOCUMENTS

CN 1626301 A 6/2005
DE 270572 A1 8/1989
(Continued)

OTHER PUBLICATIONS

International Search Report for PCT/US2013/055011 dated Mar. 19, 2014.

*Primary Examiner* — Dung Van Nguyen
(74) *Attorney, Agent, or Firm* — Levenfeld Pearlstein, LLC

(57) ABSTRACT

A saw has a system for sensing the torque on a cutting blade to signal when the blade begins to cut material. The saw has a drive belt extending between a driven wheel and a drive wheel and a belt tensioner that engages a side of the belt and maintains tension in the belt. The belt tensioner is movable to maintain the tension in the belt. A control system calculates the movement of the belt tensioner. The saw has a system for determining the size of the sacrificial blade. A through beam photoelectric emitter and receiver pair are positioned on opposite sides of the blade such that a largest cutting blade is moved above the beam regardless of a horizontal position of the cutting blade and sensor senses a vertical position of the axis of the blade. The sensor senses the vertical position of the blade axis when the blade is moved above the beam.

14 Claims, 7 Drawing Sheets

Related U.S. Application Data

(60) Provisional application No. 61/684,424, filed on Aug. 17, 2012.

(51) Int. Cl.
 B26D 1/12 (2006.01)
 B23D 59/00 (2006.01)

(52) U.S. Cl.
 CPC .............. *Y10T 83/04* (2015.04); *Y10T 83/141* (2015.04); *Y10T 83/866* (2015.04)

(56) References Cited

U.S. PATENT DOCUMENTS

| | | | |
|---|---|---|---|
| 4,432,260 | A | 2/1984 | Sarurai et al. |
| 6,237,585 | B1 | 5/2001 | Oishi |
| 8,126,254 | B2 | 2/2012 | Lasa |
| 8,707,837 | B2 | 4/2014 | Kojima |
| 10,245,660 | B2 * | 4/2019 | Myrfield ............ B23D 59/002 |
| 2001/0035535 | A1 | 11/2001 | Hayashi |
| 2003/0230466 | A1 | 12/2003 | Swinderman |
| 2004/0159198 | A1 | 8/2004 | Peot et al. |
| 2004/0163373 | A1 | 8/2004 | Adams |
| 2004/0165197 | A1 | 8/2004 | Bucher et al. |
| 2008/0058142 | A1 | 3/2008 | Joslyn |
| 2008/0060208 | A1 | 3/2008 | Benuzzi |
| 2008/0302227 | A1 * | 12/2008 | Viljanen ............... B27B 13/10 83/820 |
| 2009/0244528 | A1 | 10/2009 | Suzuki |
| 2010/0162867 | A1 * | 7/2010 | McCracken ......... B23D 45/16 83/471.3 |
| 2012/0100780 | A1 | 4/2012 | Weingart et al. |
| 2014/0309882 | A1 | 10/2014 | Antchak |

FOREIGN PATENT DOCUMENTS

| | | |
|---|---|---|
| DE | 3905949 A1 | 8/1990 |
| DE | 4321230 A1 | 3/1995 |
| DE | 19622374 A1 | 12/1997 |
| EP | 2476531 A1 | 7/2012 |
| FR | 2899685 A1 | 10/2007 |
| GB | 1355399 A | 6/1974 |
| JP | H03219901 A | 9/1991 |
| JP | H08164515 A | 6/1996 |
| JP | 2006287111 A | 10/2006 |
| WO | 9012669 A1 | 11/1990 |
| WO | 9945351 A1 | 9/1999 |
| WO | 2006064369 A1 | 6/2006 |
| WO | 2008025045 A1 | 3/2008 |

* cited by examiner

SAMPLE PREPARATION SAW

BACKGROUND

The examination of samples, such as by metallographic examination, requires a number of preparatory steps. For example, a sample may need to be cut or sectioned to a specific size prior to mounting for examination.

Saws are known for carrying out the sectioning, e.g., cutting of samples. One such saw is disclosed in Weingart, U.S. Publication 2012-0100780, the disclosure of which is incorporated herein by reference in its entirety.

In a typical sample preparation saw, the blade is sacrificial. That is, the saw blade loses mass (and size) as cutting progresses. Blade size is lost in that the diameter of the blade is reduced as cutting is carried out.

In operation, the blade moves from a non-contact, home position vertically, along an arc, to contact the sample being cut. During the cutting operation, the blade typically moves along the arc slowly so as to properly effect the cut. Movement of the blade along the arc from the home position to the sample is also carried out at a relatively slow rate in that it is difficult to determine when the blade will contact the sample. As such, in an automated cutting operation time and efficiency (e.g., the number of samples cut in a given period of time) can be lost.

Additionally, many such saws have blades that translate laterally, parallel to the blade axis, to carry out a number of cuts in succession in the sample. During such operations, the blade returns to the home position following or between each cut. Again, because of the slow movement of the blade during the non-contact portions of cycle, it is inefficient to return the blade to the home position after each cut and prior to translation.

Accordingly, there is a need for an improved system for monitoring the position of the blade relative to a sample in a sample preparation saw. Desirably, such a system detects blade size and blade contact to vary the speed and distance that the blade travels during and between cuts of the sample.

SUMMARY

A sample preparation saw has a system for sensing the torque on a cutting blade to signal when the blade begins to cut material. The saw has a drive belt extending between a driven wheel and a drive wheel. A belt tensioner engages a side of the belt and maintains a tension in the belt. The belt tensioner is movable to maintain the tension of the belt and a control system calculates the movement of the belt tensioner.

In an embodiment, the belt tensioner is pivotable to maintain the tension in the belt. The belt tensioner pivots between first and second angles to maintain the tension in the belt. The movement between the first and second angles (i.e., a change in the angle of the belt tensioner) detects the change in torque on the cutting blade. A rotary converter can be operably mounted to the belt tensioner to detect the movement between the first and second angles.

In an embodiment, the blade is moved toward the workpiece at a first speed and when the belt tensioner moves to increase the tension in the belt, the blade is moved toward the workpiece at a second speed. The first speed is greater than the second speed.

A method for cutting an object using a saw having a moving, rotating blade, in which the blade moves in a direction parallel to the rotation of the blade, includes moving the blade in the direction toward the object at a first speed. The blade contacts the object and the speed of movement of the blade toward the object is adjusted from the first speed to a second speed different from the first speed.

In such a method, the first speed is greater than the second speed. The torque on a drive belt operably connected to the blade is sensed and the speed of movement of the blade toward the workpiece is adjusted in response to a change in the sensed torque on the belt.

In an embodiment, a saw having a system for determining the size of a sacrificial cutting blade that moves from a non-contact, home position to a sample contact position includes a through beam photoelectric emitter and receiver pair. The emitter and receiver are positioned on opposite sides of the blade and are positioned such that a largest cutting blade is moved above the beam regardless of a horizontal position of the cutting blade.

A sensor senses a vertical position of a rotational axis of the cutting blade. The sensor senses the vertical position of the blade axis when the blade is moved above the beam.

In an embodiment, the saw is mounted in a cabinet and the emitter and receiver pair are mounted near opposing walls of the cabinet with the cutting blade moving vertically therebetween. The saw blade moves in an arc from the non-contact, home position to the sample contact position.

A method is also disclosed for detecting the size of a cutting blade in a saw in which the cutting blade is a sacrificial cutting blade and in which the cutting blade moves from a non-contact, home position to a sample contact position, and in which the saw has a through beam photoelectric emitter and receiver pair positioned on opposite sides of the cutting blade and that generate a beam and a corresponding signal therebetween. In such a saw, the emitter and receiver pair generate a signal. The saw further includes a sensor for sensing a vertical position of the cutting blade axis.

The method includes positioning the blade in a low position such that the beam is blocked, moving the blade out of a path between the beam and monitoring the photoelectric sensor signal. The vertical position of the cutting blade axis is sensed and, upon sensing a predetermined criteria, the vertical position of the cutting blade is recorded. The size of the cutting blade is then calculated.

The method can includes the step of sampling photoelectric sensor signals at predetermined intervals and upon reaching a predetermined number of signals indicating an absence of the blade in the path, calculating the size of the cutting blade.

The signals generated by the emitter and receiver pair can be filtered. In an embodiment, the cutting blade moves in an arc from the non-contact, home position to the sample contact position.

These and other features and advantages of the present disclosure will be apparent from the following detailed description, in conjunction with the appended claims.

BRIEF DESCRIPTION OF THE DRAWINGS

The benefits and advantages of the present device will become more readily apparent to those of ordinary skill in the relevant art after reviewing the following detailed description and accompanying and drawings, wherein.

DETAILED DESCRIPTION

Figure 1:
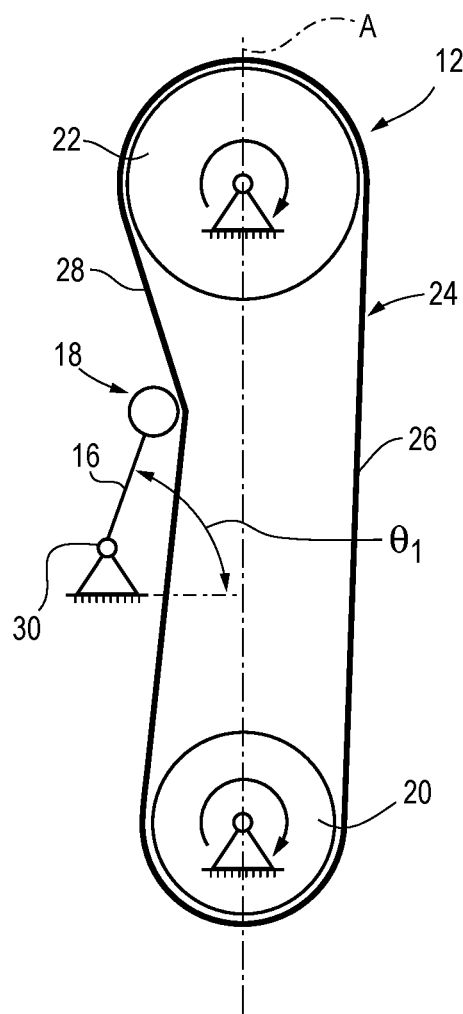
FIG. 1 is a schematic illustration of a drive belt and system for determining when the saw blade makes contact with the sample, in which the illustration shows the system when the blade is not in contact with the sample.
Figure 2:
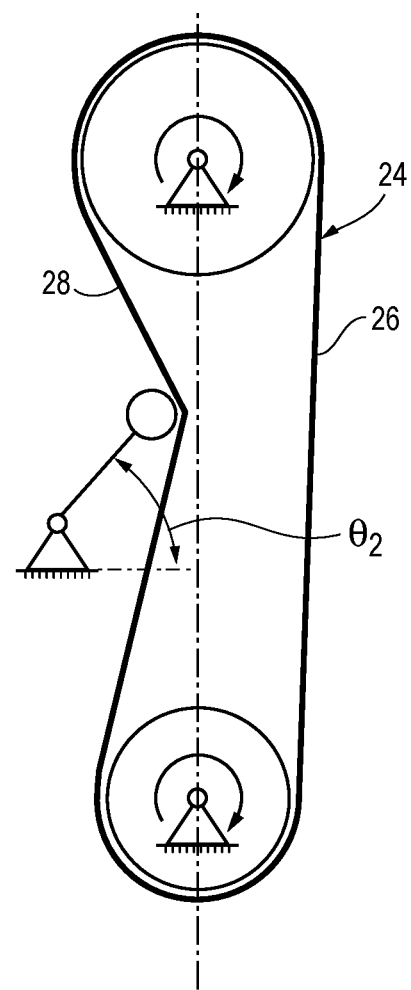
FIG. 2 is a schematic illustration similar to FIG. 1, showing the system when the blade is in contact with the sample.
Figure 3:
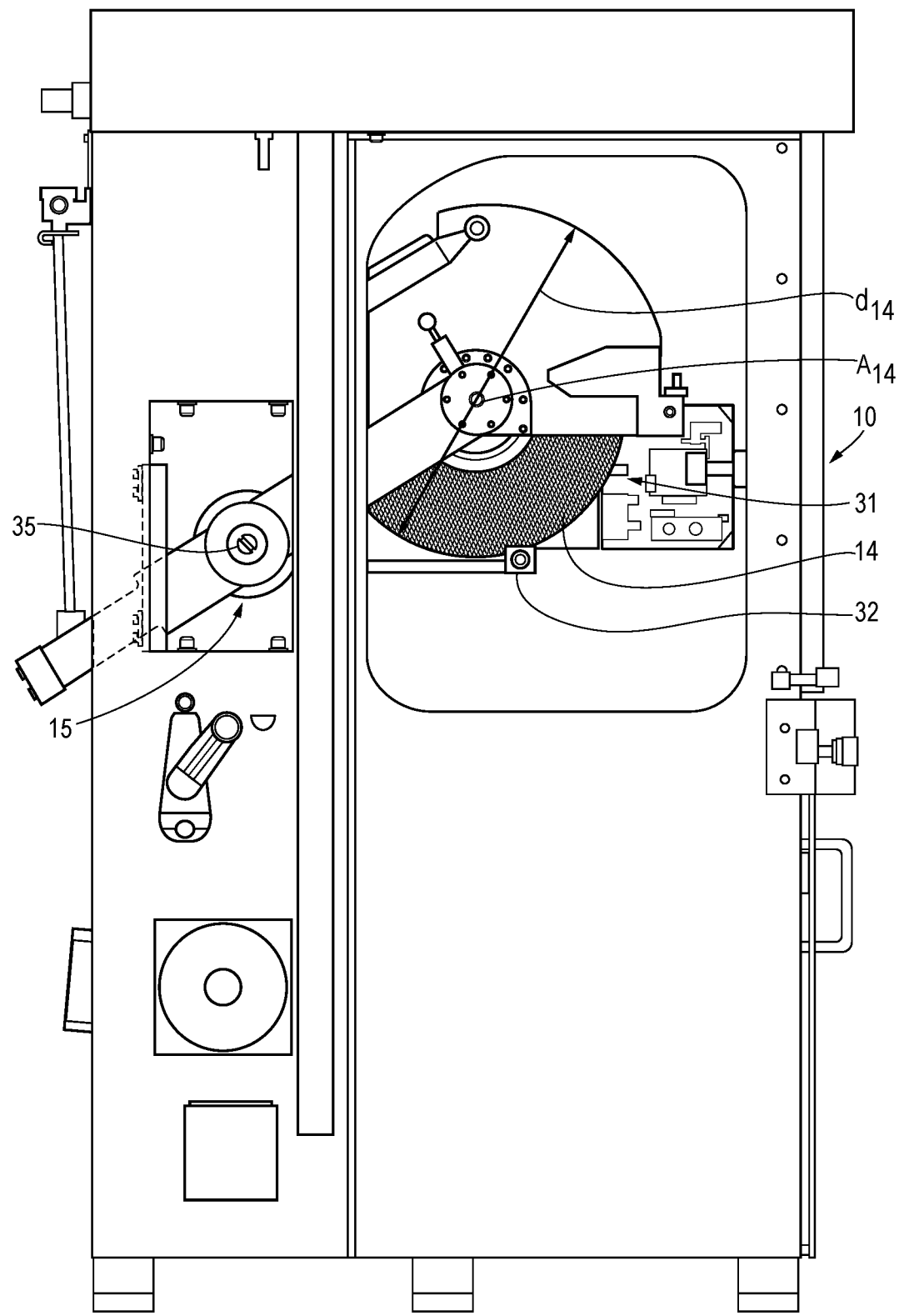
FIG. 3 is a side view of the saw cabinet and showing the location of the blade edge sensors relative to the blade edge.
Figure 4:
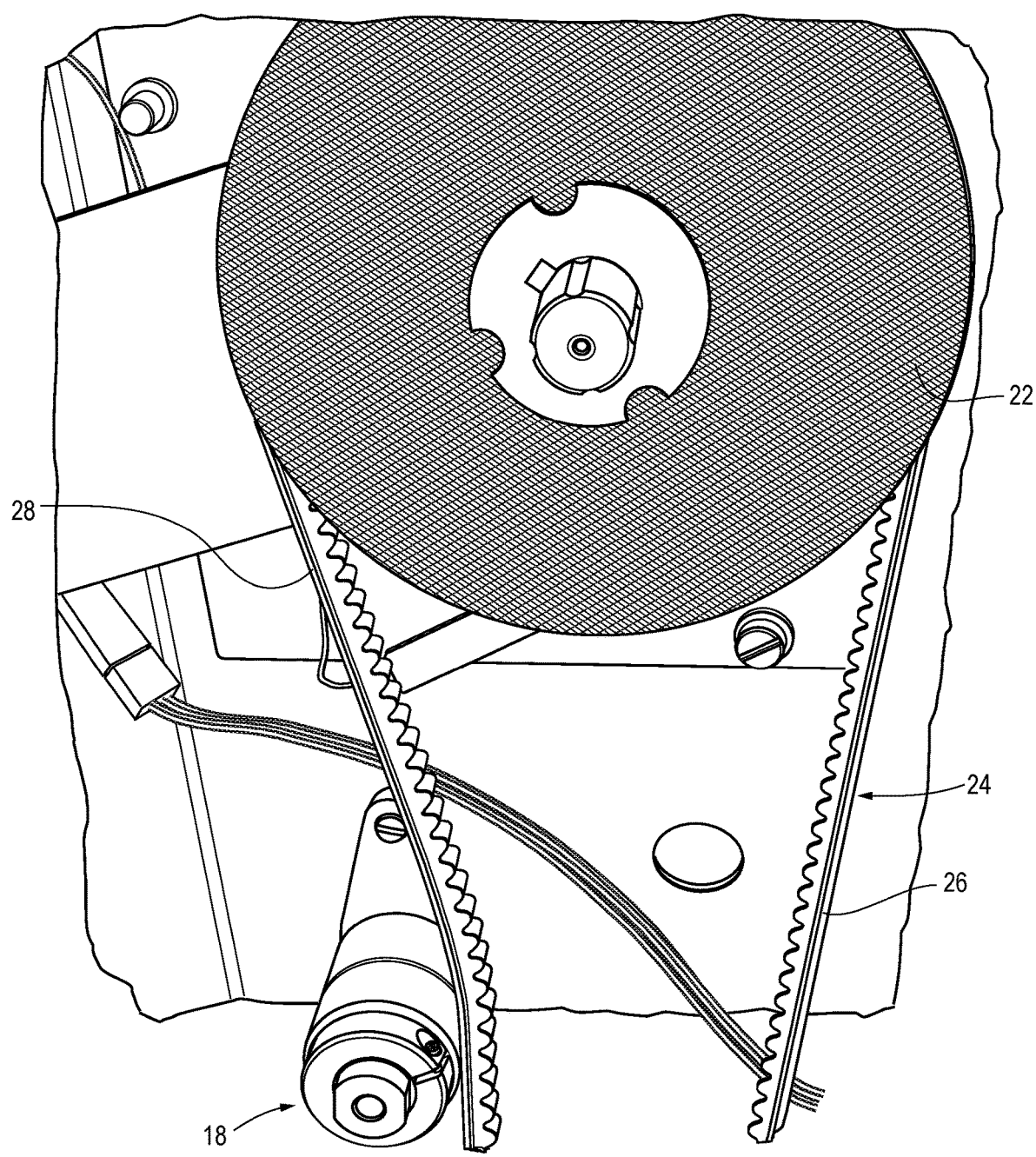
FIG. 4 is an illustration of the belt drive system showing various components thereof.
Figure 5:
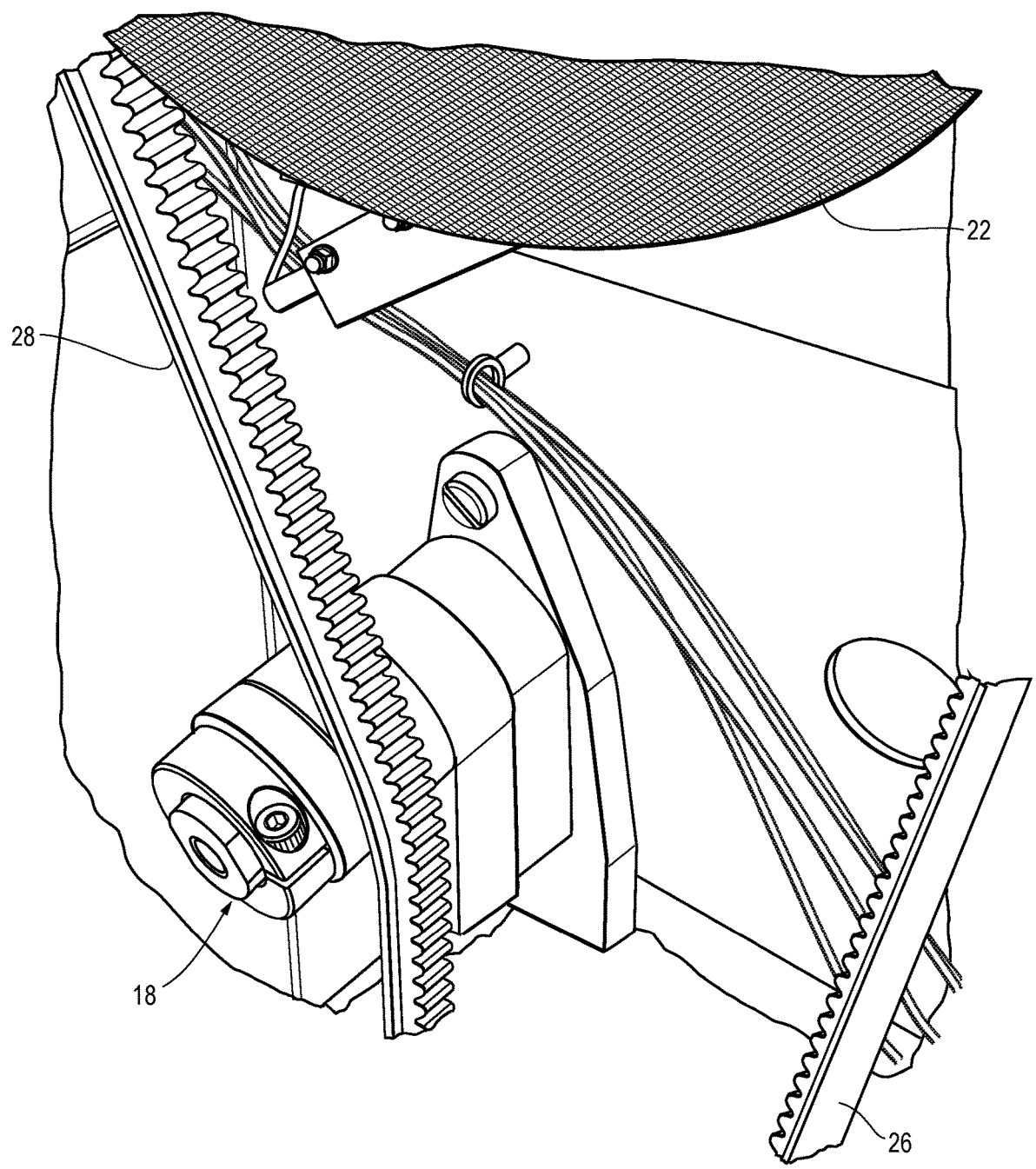
FIG. 5 is another illustration of the belt drive system showing the tensioner.
Figure 6:
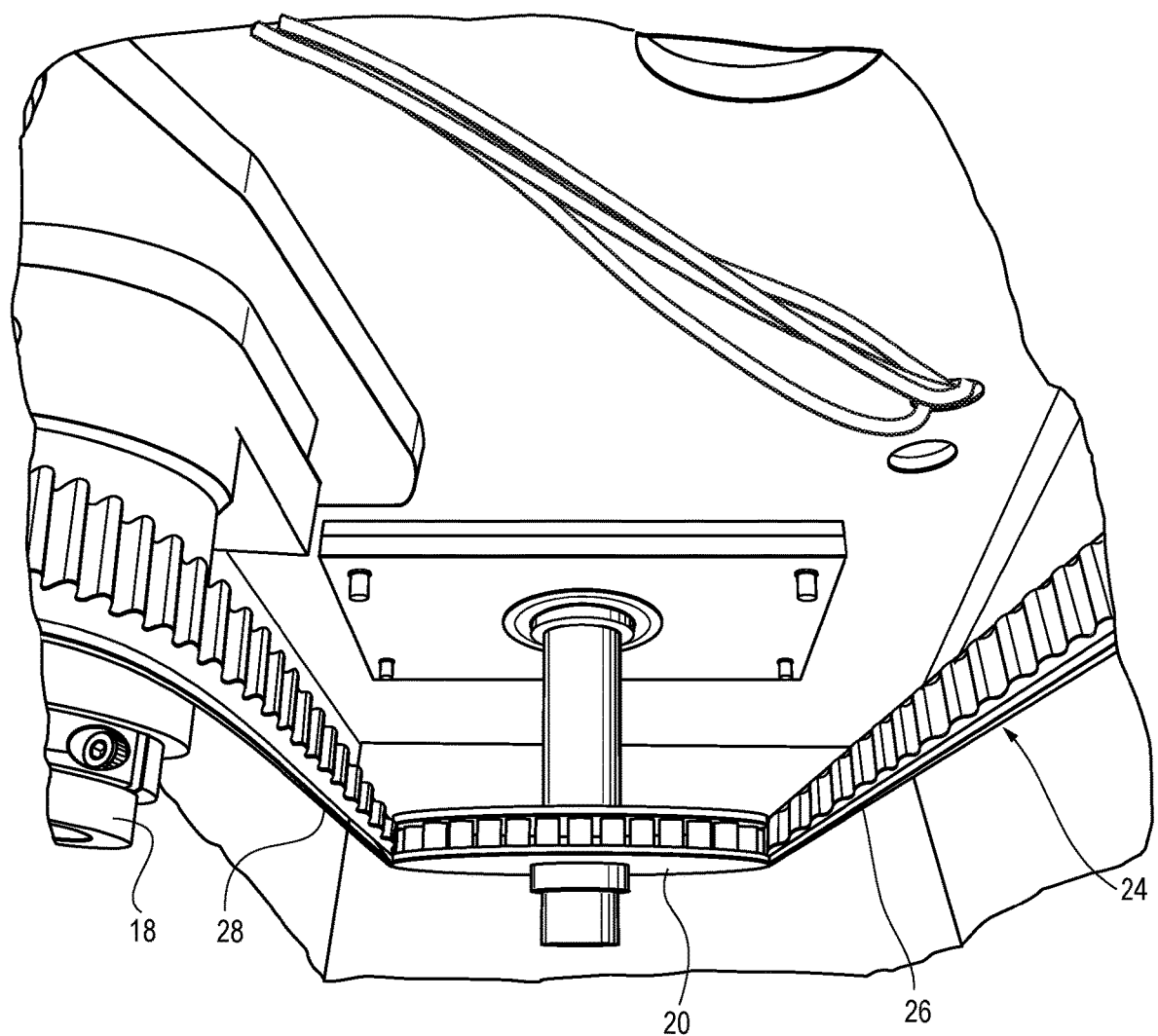
FIG. 6 is still another illustration of the belt drive system showing the blade drive wheel.
Figure 7:
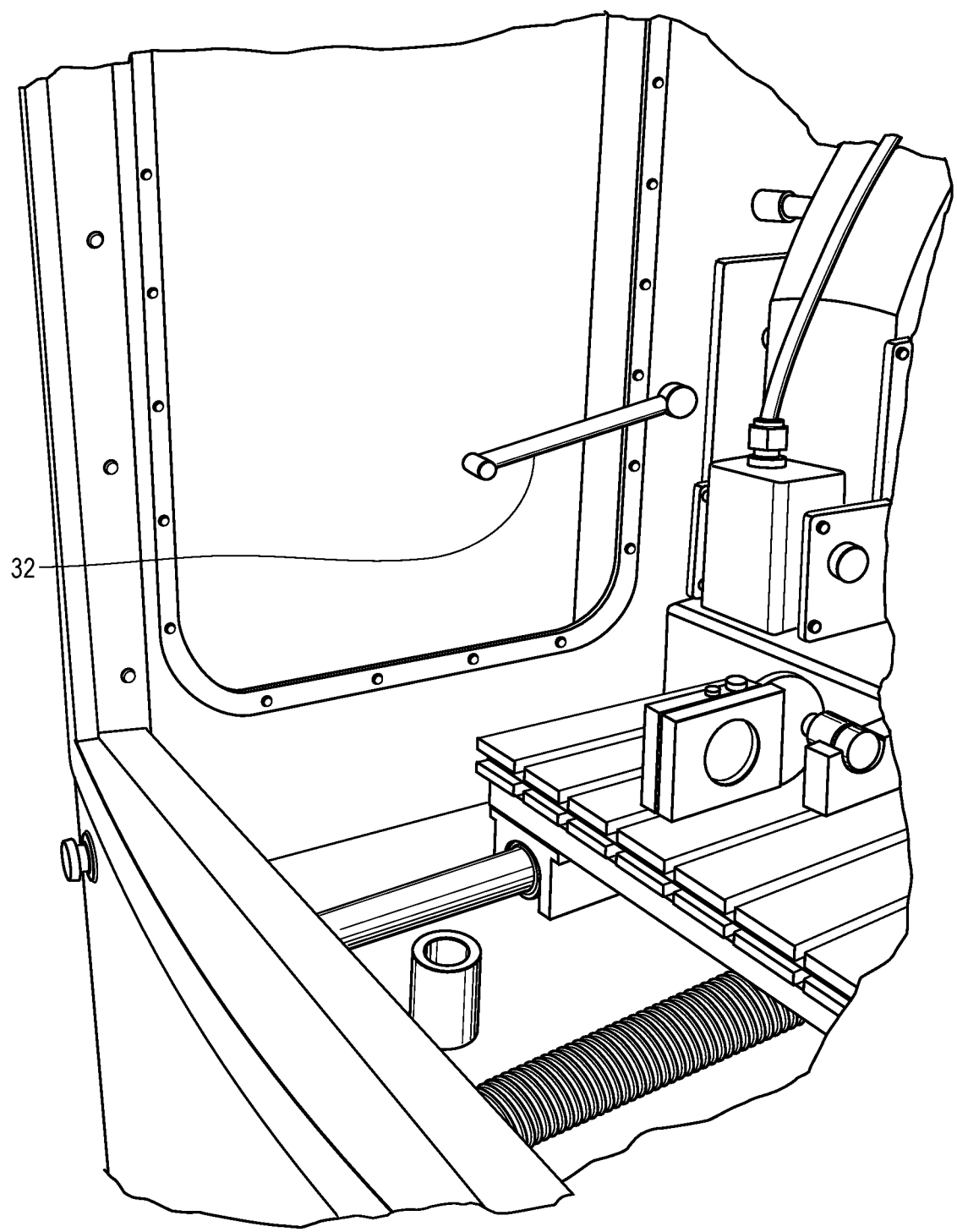
FIG. 7 is a view inside of the saw cabinet, showing the location of one of the sensors mounted in the cabinet.
Figure 8:
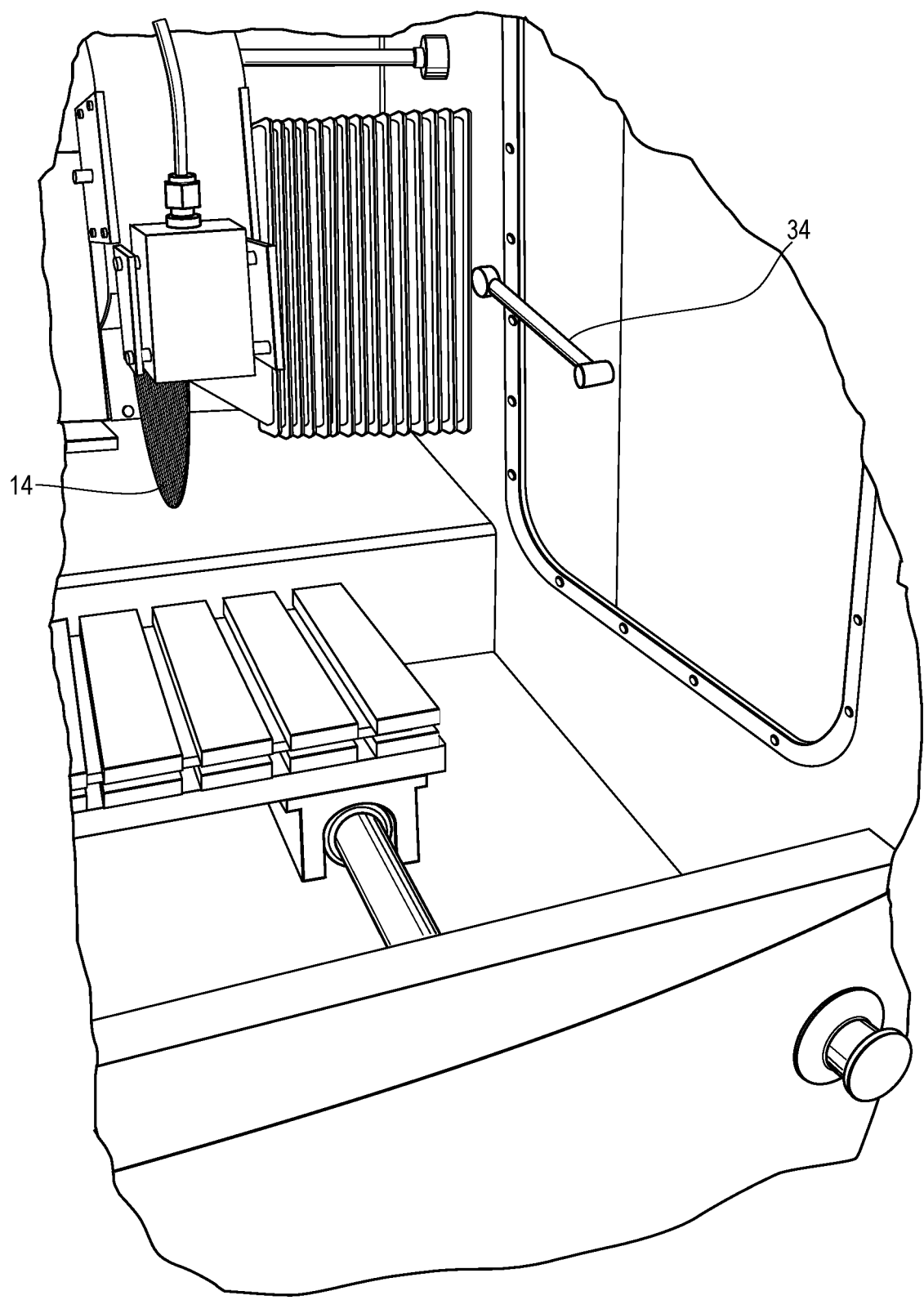
FIG. 8 is a view inside of the saw cabinet opposite of the side of FIG. 7, showing the opposite side sensor location.

While the present device and method are susceptible of embodiment in various forms, there is shown in the drawings and will hereinafter be described presently preferred embodiments with the understanding that the present disclosure is to be considered an exemplification of the device and is not intended to be limited to the specific embodiments illustrated.

Referring now to the figures and in particular, to FIGS. 1-6, there is shown a saw 10 having a system 12 for sensing the torque on a cutting blade 14 to signal when the blade begins to cut material. The system is used in an automatic saw to reduce cycle times. By sensing the beginning of a cut the blade can be moved towards the workpiece faster and be slowed down when the cut begins. This reduces the amount of time spent "cutting air". The blade is moved toward the workpiece by a drive 15.

The system senses torque on the blade by measuring the angular change ($\theta_1$-$\theta_2$) in the arm 16 of a belt tensioner 18. FIG. 1 illustrates the system 10 when the blade is not in contact with the workpiece. As seen in FIG. 1, the system includes a drive pulley 20 (as from a motor drive), a driven pulley 22 (as mounted or operably connected to the saw blade), a drive belt 24 and the belt tensioner 18.

As torque is transmitted through the belt drivetrain, the belt 24 experiences tension proportional to the torque. The tension in the belt causes the belt to stretch. The belt stretch is taken up by the movement of the belt tensioner 18.

In FIG. 1, the blade is not in contact with the workpiece. There is a lesser amount of torque on the driven pulley 22, and thus on the drive belt 24. The right-hand side (as indicated at 26 in FIG. 1) of the belt 24 is under tension and there is some, albeit minimal slack on the left-hand side (as indicated at 28) of the belt. As such, the tensioner 18, which maintains a predetermined tension on the belt 24, is pivoted away from an axis A that extends between the pulleys.

As the blade contacts the material, torque is transmitted to the driven pulley 22. The belt section 26 on the right-hand side of the system comes under increased tension and the belt section 28 on the left-hand side exhibits an increase in slack. The tensioner 18, which is biased toward the belt 24, moves, e.g., pivots, toward the axis A to maintain tension in the belt 24. The change ($\theta_1$-$\theta_2$, or $\Delta\theta$) in the belt tensioner position (or angle $\theta$ relative to the a fixed location) is used to detect changes in the torque being transmitted.

In operation, as the saw begins the cutting cycle, a minimum change in the belt tensioner 18 position is detected. A baseline position is established after the blade has started rotating but before the blade begins to move towards the part. As the blade moves toward the part, the belt tensioner position is compared to the baseline and the difference ($\Delta\theta$) is determined. When the blade contacts the workpiece, $\Delta\theta$ will increase. Once a preset threshold for $\Delta\theta$ is reached, the cutting cycle is triggered. The cutting cycle typically involves motion much slower than the motion when the blade is approaching the workpiece. Filtering may also be applied to the signals.

One of the advantages of this system is that measuring the angular change $\Delta\theta$ of the belt tensioner 18 can be done in a cost efficient manner by using a rotary encoder 30 or the like. Torque sensing is traditionally accomplished by sensing motor current. However, for some drive trains, such as those with other loads or large inertia, the motor current signal may be too noisy or delayed to be useful. Additionally, as motor power increases the cost to sense the current increases.

As noted above, the blades used in sample preparation saws are sacrificial. That is, they are worn down as samples are cut. Accordingly, there is also a need to be able to monitor the blade 14 size $d_{14}$, as the blade 14 is spinning, in order to efficiently operate the saw. Such a system must function under operating conditions which include coolant flow to the blade during cutting, and movement of the blade 14 toward the workpiece, as well as lateral movement of the blade 14, e.g., movement of the blade perpendicular to the cutting plane, to cut multiple samples. In one embodiment, movement of the blade toward the workpiece is along an arc.

Blade size detection is accomplished by a system 31 that includes a through beam photoelectric emitter 32 and receiver 34 pair. The sensor pair 32, 34 is placed so that the largest blade 14 can be moved above the beam regardless of the horizontal blade position (see FIG. 3). In operation, to detect the size of the blade, the blade starts from a low position such that the beam is blocked.

The blade 14 is then pivoted or moved upward while the photoelectric sensor signal is monitored. The signal from the photoelectric receiver is filtered to reduce false signals due to coolant or other objects interfering with the beam.

When the sensor signal meets some criteria, the position of the vertical axis (of the same blade) is sensed, as by a sensor 35 and recorded. Sensor pair 32, 34 signal samples are taken every 250 µs, and the system waits for the beam to be unblocked (received) for 20 of the last 40 sensor pair 32, 34 signal samples. The blade size is then calculated by a controller 36 from the axis $A_{14}$ position sensor 35.

One of the advantages of the present blade size detection system 31 is that it is a non-contact system. As such, there are no additional wear parts needed. In addition, the system has been found to function well while the blade is spinning and coolant is flowing. This decreases the time required to sense the blade size, and increases the operating efficiency of the system by allowing for more cutting operations in a unit of time.

It will also be appreciated that in the illustrated embodiment, the sensors do not move; however, other embodiments may include sensors that move with the blade.

Those skilled in the art will recognize the programming necessary to effectuate operation and control of the systems, and will appreciate the numerous other ways in which the systems' controls can operate.

All patents referred to herein, are incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within its scope.

What is claimed is:

1. A material removal system, comprising:
   a material removal tool;
   a drive assembly configured to move the material removal tool towards or away from a sample; and
   a control system configured to adjust movement of the material removal machine via the drive assembly based on whether the material removal tool is in contact with the sample,
   wherein the control system is configured to determine whether the material removal tool is in contact with the sample based on a contact indicating parameter, and
   wherein the contact indicating parameter comprises a change in position of a belt tensioner.

2. The system of claim 1, wherein the control system is configured to move the material removal tool via the drive assembly in a first mode when the material removal tool is not in contact with the sample and in a second mode when the material removal tool is in contact with the sample.

3. The system of claim 2, wherein the control system is configured to move the material removal tool via the drive assembly at a first speed when the material removal tool is not in contact with the sample and at a second speed when the material removal tool is in contact with the sample.

4. The system of claim 3, wherein the first speed is greater than the second speed.

5. The system of claim 1, wherein the control system is configured to move the material removal tool via the drive assembly in a first mode when the contact indicating parameter is below a threshold and in a second mode when the contact indicating parameter is above a threshold.

6. The system of claim 1, wherein the control system is configured to move the material removal tool via the drive assembly at a first speed in the first mode and at a second speed in the second mode.

7. The system of claim 1, wherein the material removal tool comprises a cutting blade.

8. A method of moving a material removal tool, the method comprising:
   moving a material removal tool towards a sample via a drive assembly; and
   modifying movement of the material removal tool via the drive assembly in response to determining the material removal tool is in contact with the sample; and
   determining whether the material removal tool is in contact with the sample using a contact indicating parameter,
   wherein the contact indicating parameter comprises a change in position of a belt tensioner.

9. The method of claim 8, wherein the material removal tool is moved via the drive assembly in a first mode when the material removal tool is not in contact with the sample and in a second mode in response to determining the material removal tool is in contact with the sample.

10. The method of claim 8, wherein the material removal tool is moved via the drive assembly at a first speed when the material removal tool is not in contact with the sample and at a second speed in response to determining the material removal tool is in contact with the sample.

11. The method of claim 10, wherein the first speed is greater than the second speed.

12. The method of claim 8, further comprising determining that the material removal tool is not in contact with the sample when the contact indicating parameter is less than a threshold, and determining that the material removal tool is in contact with the sample when the contact parameter is greater than the threshold.

13. The method of claim 12, wherein the threshold is preset.

14. The method of claim 8, wherein the material removal tool is a cutting blade.

* * * * *